United States Patent Office.

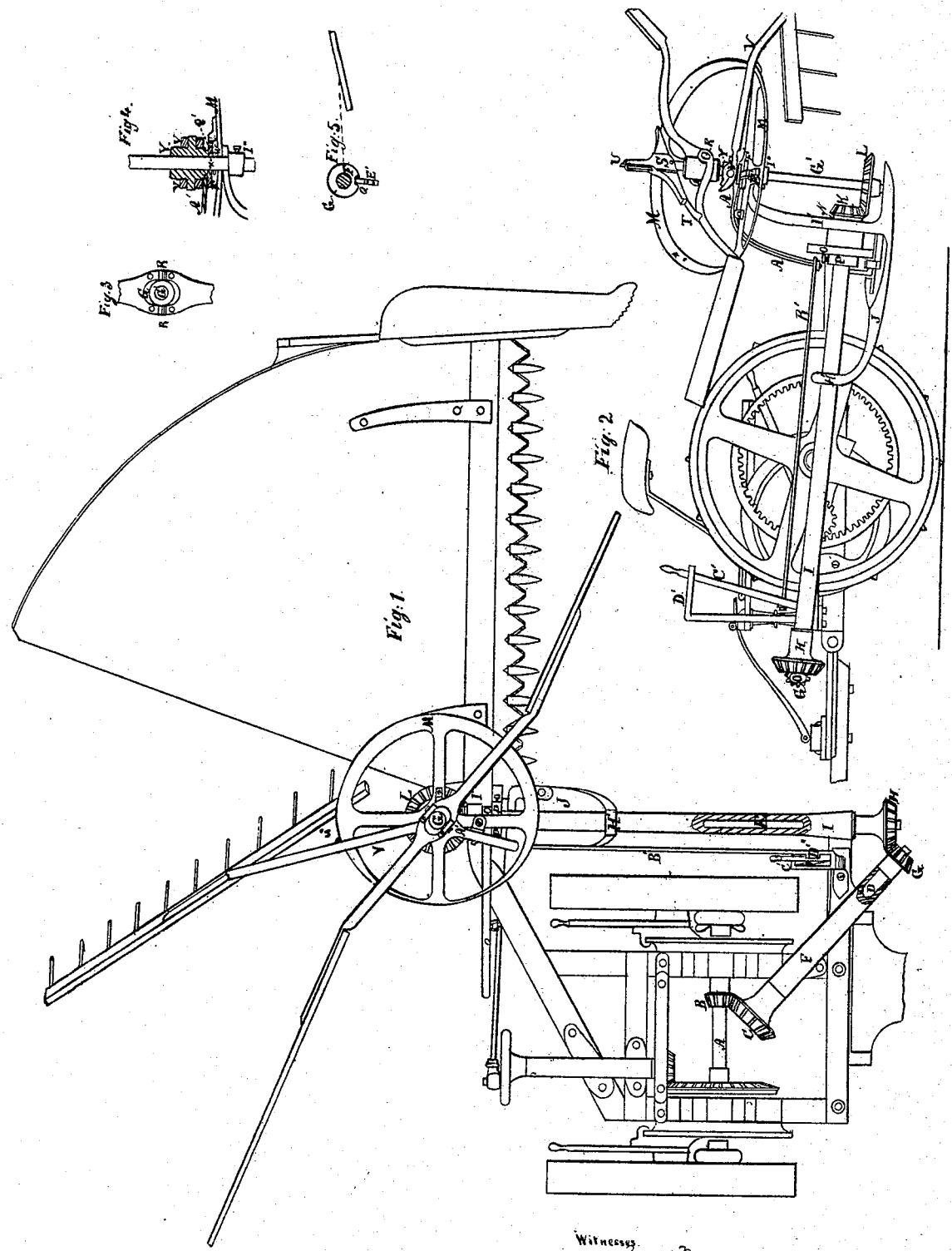

WILLIAM N. WHITELEY, JR., OF SPRINGFIELD, OHIO.

*Letters Patent No. 64,819, dated May 14, 1867.*

IMPROVEMENT IN HARVESTER-RAKES.

*The Schedule referred to in these Letters Patent and making part of the same.*

TO ALL WHOM IT MAY CONCERN:

Be it known that I, WILLIAM N. WHITELEY, Jr., of Springfield, in the county of Clark, and State of Ohio, have invented a certain new and useful Improvement in Harvesters; and I hereby declare the following to be a full, clear, and exact description of the same, reference being had to the accompanying drawings, in which—

Figure 1 is a plan view of my machine, the driver's seat and foot-board being removed so as to show the positions of the gearings.

Figure 2 is an elevation of that side of the frame and gearing nearest the cutting apparatus.

Figure 3 exhibits the mode of connecting the rake and reel-arms and their driving-shaft.

Figure 4 exhibits, partially in section, connection of the rake with the reel-shaft, and the method of throwing said arm in and out of gear.

Figure 5 is a plan of the flange and stop, which determines the point where the rake may be thrown out of gear.

My invention relates to that class of harvesting machines which have the cutting apparatus hinged to the frame of the machine; and consists, first, in operating the reel and automatic rake by a train of gearing; second, making the drag-bar to which the cutting apparatus is attached hollow, so that the shaft which drives the reel may pass through it; third in the manner of disconnecting the rake, so that it can only be thrown out of gear when not over the platform; fourth, in the manner of passing the reel-arms over the rake when the latter is at rest; fifth, in the unshipping lever, by which the rake is thrown in and out of gear; sixth, in the manner of connecting or hanging the reel-arms upon the reel-shaft.

That others may understand the construction and operation of my invention, I will particularly describe it.

The main frame, driving-wheels, and cutter-driving gearing are of any suitable construction. Upon the main driving-shaft A I place a small bevel-wheel, B, which gears into and drives the larger bevel-wheel C, upon one end of counter-shaft D. At the other end of the shaft D is a small bevel-wheel, G, which gears into the pinion H, and drives the shaft E, which imparts motion to the rake and reel. The shaft D passes through and is supported by a long tubular box, F, which is secured by proper fastenings rigidly to the frame of the machine, in such an oblique position that while the gear at the inner end is in mesh with the bevel-wheel B upon the main shaft, the bevel-wheel G is in position to gear with the pinion H. The drag-bar I has hitherto been made solid; but I propose to make it hollow, and to pass the shaft E through it in the direction of its length, and in that way I shall be enabled to drive the rake and reel-shaft G' by gearing, instead of driving it by belt, as has heretofore been done. The drag-bar I is attached to the front bar of the main frame, which is extended laterally ar enough to pass beyond the bearing-wheel on that side. From this front bar it extends backward parallel with the machine's line of forward movement, and passes through the lugs H' and I', which are either cast as a part of the shoe J, or rigidly secured to it by bolts or rivets. At the points where the drag-bar passes through the lugs H' I' it is cylindrical, and acts as a bearing or journal upon which the shoe J moves as an axis, as the outer end of the cutting apparatus rises or falls with the undulations of the ground over which it is drawn. The shaft which supports and drives the reel and the automatic rake is stepped upon the rear end of the shoe J at a little distance behind the lug I', and in line with the centre of the shaft E. Motion is communicated to the reel-shaft G' from the shaft E, by the bevel-gears K and L, which must always remain in mesh, because the axis of the gear K is also the axis upon which the shoe J moves when the outer end of the cutting apparatus rises or falls. The upper end of the shaft G' has its bearing at the top of the lug I', which is prolonged upward, as shown in fig. 2, for that purpose. The reel and rake-guide M is also secured to the upper end of the lug I'. The shoe J is secured upon the drag-bar by the screw-collar N, which is screwed upon the end of the drag-bar after the shoe and other parts are in place. The rear end of the drag-bar I is connected to the main frame, and supported by passing through the end of the rear cross-bar or brace of the main frame, extended for that purpose, or by a suitable bracket attached to the main frame. The lever O, by which the attendant can lift the outer end of the cutting apparatus from the ground, is also hung upon the drag-bar, its point or short arm resting behind a shoulder cast upon the upper side of the shoe, or placed upon the upper side of the finger-bar, as shown in the drawings. The collar P, with its set-screw, prevents any forward movement of these parts upon the drag-bar  The arms of the opposite blades of the reel join in the centre so that the said opposite blades are connected, and as one rises the other is correspondingly depressed. An elongated hole, Q, is made through the central part of this continuous arm, and suitable boxes are provided at each side of Q, for the trunnions or journals upon which the reel-arms rest and move as they rise and fall, guided by M. The trunnions R are formed upon a collar, and secured rigidly to the shaft G'. There may be two or four blades to the reel, as desired. Above the trunnions R, and pivoted to the top of the shaft G', is the cross-head S, with springs T T projecting from its ends and resting upon the reel-arms. The spring U, which is secured to a cap which fits over the extreme upper end of the shaft G', and is independent of the cross-head S, always tends to keep the reel-arm which is travelling over the upper part of the guide in contact therewith, while the opposite arm is a little raised from the guide. The rake-arm V is hung upon trunnions attached to a collar, Y, which is placed just below the collar from which the trunnions R R project, and between it and the lug I', where the shaft G' passes through it. In the lower end of this collar Y, to which the rake is hung, is a notch, X, into which the clutch-pin W slips when the rake is in gear. The pin W passes through the shaft G', and is rigid. When seated in the notch X, it forces the collar Y and the rake to revolve with the shaft G'. The rake is thrown out of gear by raising the collar Y, so that it is clear of the pin W. This is accomplished through the clutch-lever A', connecting-rod B', and hand-lever C', or any equivalent arrangement of parts. The hand-lever C' is provided with stops, as shown at D', fig. 1, by which it is held in position as desired. It is desirable that, in throwing the rake out of gear, it should only be done when the rake is not over the platform. To insure this result, I attach to the top of the lug I', or in some convenient stationary part, a stop-plate, E', which is rigidly secured, and has a finger projecting over the edge of the flange F', so that the collar Y cannot be raised up while the finger remains in that position. I then cut a notch, Q', in the edge of the flange F', which is so disposed that when said notch comes under the said finger, then the collar Y may be raised up and thrown out of gear, and the finger of the plate E' being between the sides of the notch Q' prevents the collar Y and rake V from moving while so raised out of gear. The position of the notch Q' is such that, when it permits the collar Y to be raised up, the rake will have passed beyond the rear of the platform a little distance. The hook H'', extending from the lower side of the rake-arm V, underneath the guide-rim M, prevents the rake from rising materially from the platform. When the rake is thrown out of gear and is at rest, the arms of the reel will rise up sufficiently to slide over it as they revolve. The collar I'', with its set-screw, prevents any upward movement of the shaft G' which would remove it from its step. Covers are placed over the gears G and H and K and L, to protect them from dust and dirt. When this machine is to be used for mowing, the platform and the reel and rake are removed. The seat being reversed upon its standard, and the standard itself reversed upon the frame, the driver's weight is brought to the rear of said frame, so as to balance the machine more perfectly, and this change of position also enables the driver to reach the lever O, to raise the outer end of the cutting apparatus, to clear any obstruction that may be in its road.

The operation of these devices is apparent. The movements communicated by gearing are much more uniform and reliable than when transmitted through belts, which are constantly liable to variations of tension with every change or undulation of the surface. With my system of gearing, the cutting apparatus and the vertical position of the reel and rake-shaft may vary with every undulation of the ground, without in the slightest degree affecting the operation of the reel or rake, because the rising or falling of the outer end of the cutting apparatus is a movement upon a centre which is coincident with the axis of the driving-shaft, and consequently no movements of the cutting apparatus will throw the gear-wheels out of mesh. It is of importance to provide means whereby the rake shall be prevented from ceasing to move except when not over the platform, even though the attendant should endeavor to throw it out of gear, for if it ceased to move while over the platform, it would almost invariably interfere with and obstruct the action of the rake or the falling grain. It would frequently happen also that it would be started again when not in the proper position in respect to the wings of the reel. The arrangements of devices which I have adopted secure these desired results perfectly. The stop-plate E effectually prevents the collar Y from rising off the clutch-pin W until the rake has passed beyond the rear edge of the platform, and when once thrown out of gear it cannot be again connected until the clutch-pin W comes under the recess X, which can only happen when the rake is in proper position with regard to the arms of the reel. The reel-arms hung upon trunnions insures them the utmost freedom of movement.

Having described my invention, what I claim as new, and desire to secure by Letters Patent, is—

1. In combination with a harvesting machine, having two adjustable wheels, a hinged cutting apparatus, and a raking and reeling mechanism mounted on the inner end of said cutting apparatus, and rotating upon a shaft about vertical, the shaft E, and counter-shaft D, with their bevel-gear connections, for the purpose of driving the said reel and rake by a train of gearing from the main pinion-shaft, and so that the movements of the reel and rake may at all times conform to the position of the finger-bar, substantially as set forth.

2. In combination with a harvesting machine having two wheels and a hinged cutting apparatus, the tubular drag-bar I, rigidly secured to the frame of the machine, and forming the centre upon which the cutting apparatus vibrates, so that the axis of the reel and rake's driving-shaft may be coincident with the axis upon which the cutting apparatus vibrates, substantially as set forth.

3. The collar Y, provided with the notch Q', in combination with the stop-plate E', and clutch-lever A', substantially as and for the purpose set forth.

4. The clutch-lever A', in combination with connecting-rod B' and hand-lever C', constructed and arranged as set forth.

WILLIAM N. WHITELEY, Jr.

Witnesses:
 G. D. CARPENTER.
 GEO. ARTHUR.